(12) United States Patent  
Detienne et al.

(10) Patent No.: US 11,985,228 B2  
(45) Date of Patent: May 14, 2024

(54) CONFIGURATION PAYLOAD SEPARATION POLICIES

(71) Applicant: Cisco Technology, Inc., San Jose, CA (US)

(72) Inventors: Frédéric René Philippe Detienne, Harzé (BE); Reda Haddad, San Jose, CA (US); Ryan Joseph Jaques, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/390,272

(22) Filed: Jul. 30, 2021

(65) Prior Publication Data

US 2023/0034615 A1 Feb. 2, 2023

(51) Int. Cl.
*H04L 9/08* (2006.01)
*H04L 9/14* (2006.01)
*H04L 12/46* (2006.01)

(52) U.S. Cl.
CPC .......... *H04L 9/0825* (2013.01); *H04L 9/0866* (2013.01); *H04L 9/14* (2013.01); *H04L 12/4641* (2013.01)

(58) Field of Classification Search
CPC ....... H04L 9/0825; H04L 9/0866; H04L 9/14; H04L 12/4641
USPC ........................................................ 713/171
See application file for complete search history.

(56) References Cited

U.S. PATENT DOCUMENTS

| 11,120,151 B1* | 9/2021 | Allo ........................ G06F 21/80 |
| 2002/0118836 A1 | 8/2002 | Howard et al. |
| 2004/0054630 A1* | 3/2004 | Ginter ................ H04N 21/6581 |
| | | 375/E7.009 |
| 2005/0166024 A1* | 7/2005 | Angelo ................. G06F 21/575 |
| | | 711/164 |
| 2007/0098152 A1 | 5/2007 | Detrick et al. |
| 2008/0181406 A1 | 7/2008 | Iyer et al. |
| 2010/0185843 A1 | 7/2010 | Olarig et al. |
| 2011/0222691 A1* | 9/2011 | Yamaguchi ............. G06F 21/10 |
| | | 380/278 |
| 2014/0082257 A1* | 3/2014 | Scouller .............. G06F 12/1466 |
| | | 711/E12.008 |
| 2014/0173282 A1 | 6/2014 | Pascariello et al. |
| 2015/0106631 A1* | 4/2015 | Bettendorff .......... G06F 21/575 |
| | | 713/193 |
| 2017/0337380 A1* | 11/2017 | Domke ................. G06F 21/575 |
| 2018/0373878 A1* | 12/2018 | Jung ..................... H04L 9/0894 |
| 2020/0226273 A1* | 7/2020 | Kariu .................... G06F 16/192 |

(Continued)

*Primary Examiner* — Moeen Khan  
(74) *Attorney, Agent, or Firm* — Polsinelli P.C.

(57) ABSTRACT

Disclosed are systems, apparatuses, methods, and computer-readable media for configuration payload separation policies. According to at least one example, a method is provided for device function. The method includes: during a boot sequence of a network device, generating a unique key for encrypting and decrypting data; identifying a secure location in the network device for storing the unique key; storing the unique key in the secure location; encrypting a configuration payload with the unique key; storing the encrypted configuration payload in an external non-volatile memory; and, in response to a request to access data within the configuration payload, decrypting the encrypted configuration payload using the unique key.

18 Claims, 8 Drawing Sheets

(56) References Cited

U.S. PATENT DOCUMENTS

2021/0005331 A1\* 1/2021 Sawada .................. G16Y 20/10
2021/0312057 A1\* 10/2021 Kloth ...................... H04L 9/088

\* cited by examiner

CONFIGURATION PAYLOAD SEPARATION POLICIES

TECHNICAL FIELD

The present disclosure relates generally to computer networks, and, more particularly, to configuration payload separation policies.

DESCRIPTION OF THE RELATED TECHNOLOGY

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

A private network may include devices that are owned or administered by a single enterprise and grouped into site networks, which may be geographically distributed over a wide area. Each site network may include one or more local area networks (LANs) connecting the devices at that particular site.

With the advent of Virtual Private Network (VPN) technology, enterprises can now securely share data between site networks over a public network, such as the Internet. For example, a hub or central VPN site may be the network at the headquarters of the enterprise, while spoke site networks are typically networks at geographically distributed branch offices, sales offices, manufacturing or distribution facilities, or other remote site of the enterprise.

An entity employs various network equipment (e.g., routers, switches) to configure secure networks with routing policies and may contain sensitive information related to that entity's network. The sensitive information can be stored in a non-volatile memory, and that sensitive information can be obtained in the event the networking equipment is made available to another party.

DETAILED DESCRIPTION

Figure 1:
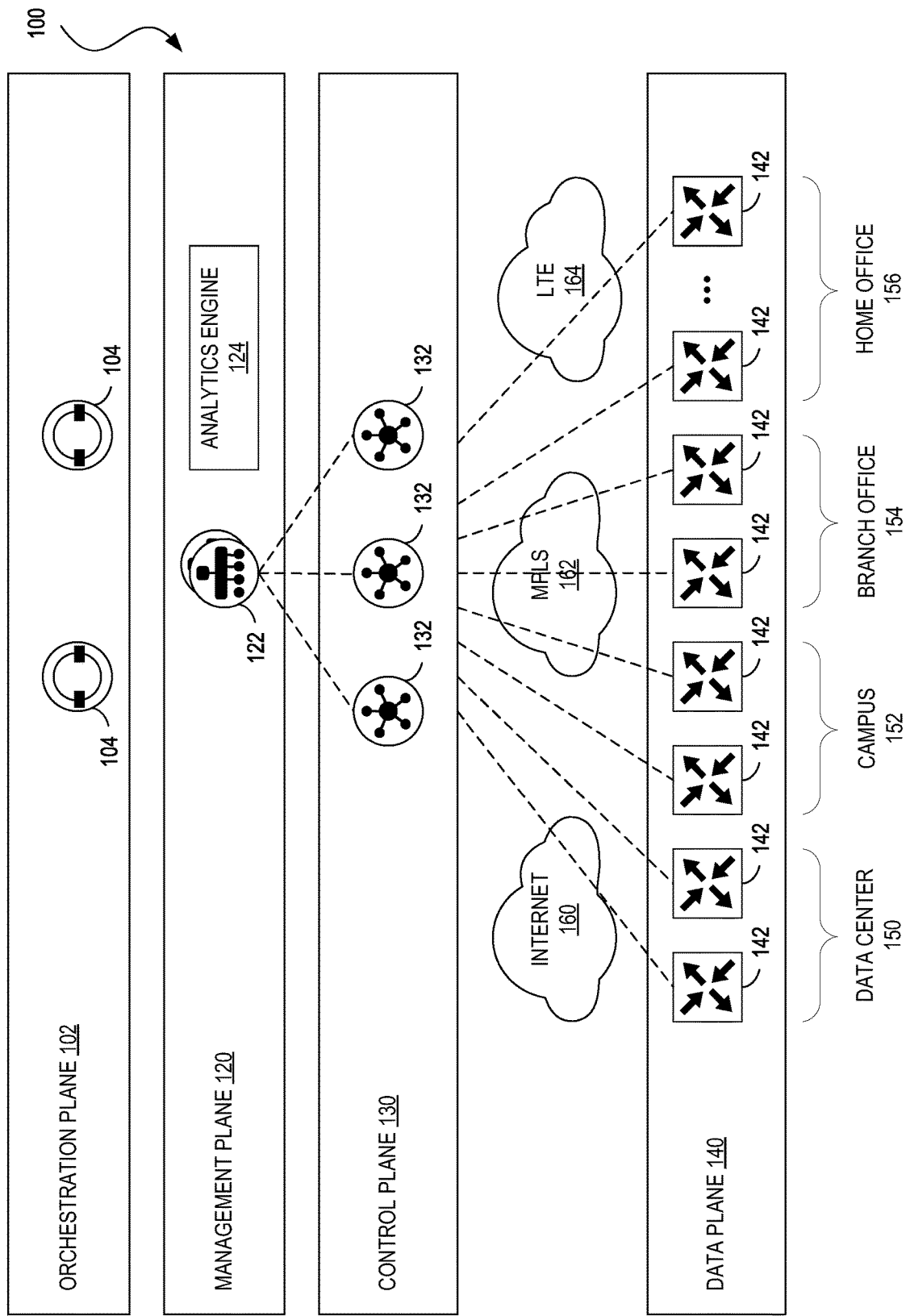
FIG. 1 illustrates an example of a high-level network architecture in accordance with some examples of the disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Methods for managing security configuration payloads are described in detail below. A security conscious entity can implement a configuration payload policy that separates data across non-volatile memory. Separating one non-volatile memory from the network device prevents the security configuration payload from being exposed to a malicious party.

Disclosed are systems, apparatuses, methods, and computer-readable media for configuration payload separation policies. According to at least one example, a method is provided for device function. The method includes: during a boot sequence of a network device, generating a unique key for encrypting and decrypting data; identifying a secure location in the network device for storing the unique key; storing the unique key in the secure location; encrypting a configuration payload with the unique key; storing the encrypted configuration payload in an external non-volatile memory; and, in response to a request to access data within the configuration payload, decrypting the encrypted configuration payload using the unique key.

In another example, an apparatus for device function is provided that includes a memory (e.g., configured to store data, such as virtual content data, one or more images, etc.) and one or more processors (e.g., implemented in circuitry) coupled to the memory. The one or more processors are configured to and can: during a boot sequence of a network device, generate a unique key for encrypting and decrypting data; identify a secure location in the network device for storing the unique key; store the unique key in the secure location; encrypt a configuration payload with the unique key; store the encrypted configuration payload in an external non-volatile memory; and, in response to a request to access data within the configuration payload, decrypt the encrypted configuration payload using the unique key.

In another example, a non-transitory computer-readable medium is provided that has stored thereon instructions that, when executed by one or more processors, cause the one or more processors to: during a boot sequence of a network device, generate a unique key for encrypting and decrypting data; identify a secure location in the network device for storing the unique key; store the unique key in the secure location; encrypt a configuration payload with the unique key; store the encrypted configuration payload in an external non-volatile memory; and, in response to a request to access data within the configuration payload, decrypt the encrypted configuration payload using the unique key.

In some aspects, the secure location is determined to be a most secure location of the network device based on a security check of each non-volatile memory.

In some aspects, the configuration payload comprises one or more of configuration information, IP addresses, VLAN information, security certificates, encryption keys, unique user information, log information, trace information, runtime application data.

In some aspects, the external non-volatile memory is physically detachable from the network device.

In some aspects, the external non-volatile memory comprises a network storage device.

In some aspects, one or more of the methods, apparatuses, and computer-readable medium described above further comprise: receiving a boot loader over a network to perform the boot sequence.

In some aspects, sensitive information stored in the external non-volatile memory is inaccessible when detached from the network device.

Disclosed are systems, apparatuses, methods, and computer-readable media for configuration payload separation policies. According to at least one example, a method is provided for device function. The method includes: during a boot sequence of a network device, generating a first unique key for encrypting and decrypting data; encrypting the first unique key with a second unique key; storing the encrypted first unique key on an external non-volatile memory device; encrypting a configuration payload with the first unique key; storing the encrypted configuration payload in an internal non-volatile memory of the network device; in response to a request to access data within the configuration payload, decrypting the encrypted first unique key using the second unique key and decrypting the encrypted configuration payload using the first unique key.

In another example, an apparatus for device function is provided that includes a memory (e.g., configured to store data, such as virtual content data, one or more images, etc.) and one or more processors (e.g., implemented in circuitry) coupled to the memory. The one or more processors are configured to and can: during a boot sequence of a network device, generate a first unique key for encrypting and decrypting data; encrypt the first unique key with a second unique key; store the encrypted first unique key on an external non-volatile memory device; encrypt a configuration payload with the first unique key; store the encrypted configuration payload in an internal non-volatile memory of the network device; in response to a request to access data within the configuration payload, decrypt the encrypted first unique key using the second unique key and decrypting the encrypted configuration payload using the first unique key.

In another example, a non-transitory computer-readable medium is provided that has stored thereon instructions that, when executed by one or more processors, cause the one or more processors to: during a boot sequence of a network device, generate a first unique key for encrypting and decrypting data; encrypt the first unique key with a second unique key; store the encrypted first unique key on an external non-volatile memory device; encrypt a configuration payload with the first unique key; store the encrypted configuration payload in an internal non-volatile memory of the network device; in response to a request to access data within the configuration payload, decrypt the encrypted first unique key using the second unique key and decrypting the encrypted configuration payload using the first unique key.

In some examples, one or more of the methods, apparatuses, and computer-readable medium described above further comprise: determining a secure location for storing the second unique key in the network device based on a security check of each non-volatile memory.

In some examples, the second unique key is stored in a network location that is accessible to the network device after authentication.

In some examples, the configuration payload comprises one or more of configuration information, IP addresses, VLAN information, security certificates, encryption keys, unique user information, log information, trace information, runtime application data.

In some examples, wherein the external non-volatile memory is physically detachable from the network device.

In some examples, one or more of the methods, apparatuses, and computer-readable medium described above further comprise: receiving a boot loader over a network to perform the boot sequence.

EXAMPLE EMBODIMENTS

Network equipment may contain sensitive information about an entity such as IP addresses, configuration information that can reveal other network devices, user information, etc. Security conscious entities that utilize various network components and infrastructures to address their networking and information technology needs, are wary of returning damaged network equipment to their network providers due the sensitive nature of information available on such devices, and because a malicious party may intercept the network equipment and obtain that sensitive information. Instead, these entities are refraining from returning their equipment (e.g., routers, switches, storage devices, telephones, data center equipment, etc.) and instead may select to pile them up to be destroyed eventually. This introduces a significant cost to both the entities as well as the providers of network equipment.

Wiping off a device with standard methods such as deleting files or reformatting long term storage are not sufficient as there is a fear that the procedure is not carried out properly. Additionally, in order to apply a wipe out procedure, the system must be functional which is usually not the case when the devices must be returned. The device may not even boot or the storage may be inaccessible by the onboard controller but a dedicated attacker (an unauthorized and/or malicious actor) with adequate hardware may be able to retrieve the data from an otherwise unresponsive or broken network device such as a disk, a flash drive, etc., on the device. For example, in the event the network device stores sensitive information in an application-specific integrated circuit (ASIC) or a functional programmable gate array (FPGA), the device may leave data exposed on the network device. In this situation, data can only be removed by wiping the network device and non-functional network devices may potentially expose sensitive information.

An alternative solution is proposed in this disclosure for securely wiping out sensitive and private information on a device (e.g., device configuration information) and allowing them to be returned to an equipment provider or manufacturer without exposing the sensitive and private information on such devices to a possible compromise.

In some examples, methods are described below to configure payload separation policies to ensure that the entity's sensitive and/or private information cannot be accessed by separating configuration payload across different non-volatile memories/devices.

The disclosure begins with a description of one or more example network architectures and network equipment architectures that may be utilized by an entity (hence the need for the entity to purchase/lease network equipment that may eventually need to be returned/replaced), with reference to FIGS. 1-4. The proposed solution is then described with reference to FIGS. 5 and 6. The disclosure concludes with a description of example network devices and computing systems.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122 and one or more analytics engine 124. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122. Analytics engine 124 can collect various types of information and intelligence on operation and performance of system components to be used by network management component 122 in providing intelligence and management capabilities to the user.

The control plane 130 can build and maintain a network topology and make decisions on where traffic flows. The control plane 130 can include one or more physical or virtual network controller appliance(s) 132. The network controller appliance(s) 132 can establish secure connections to each edge network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the edge network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 156, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
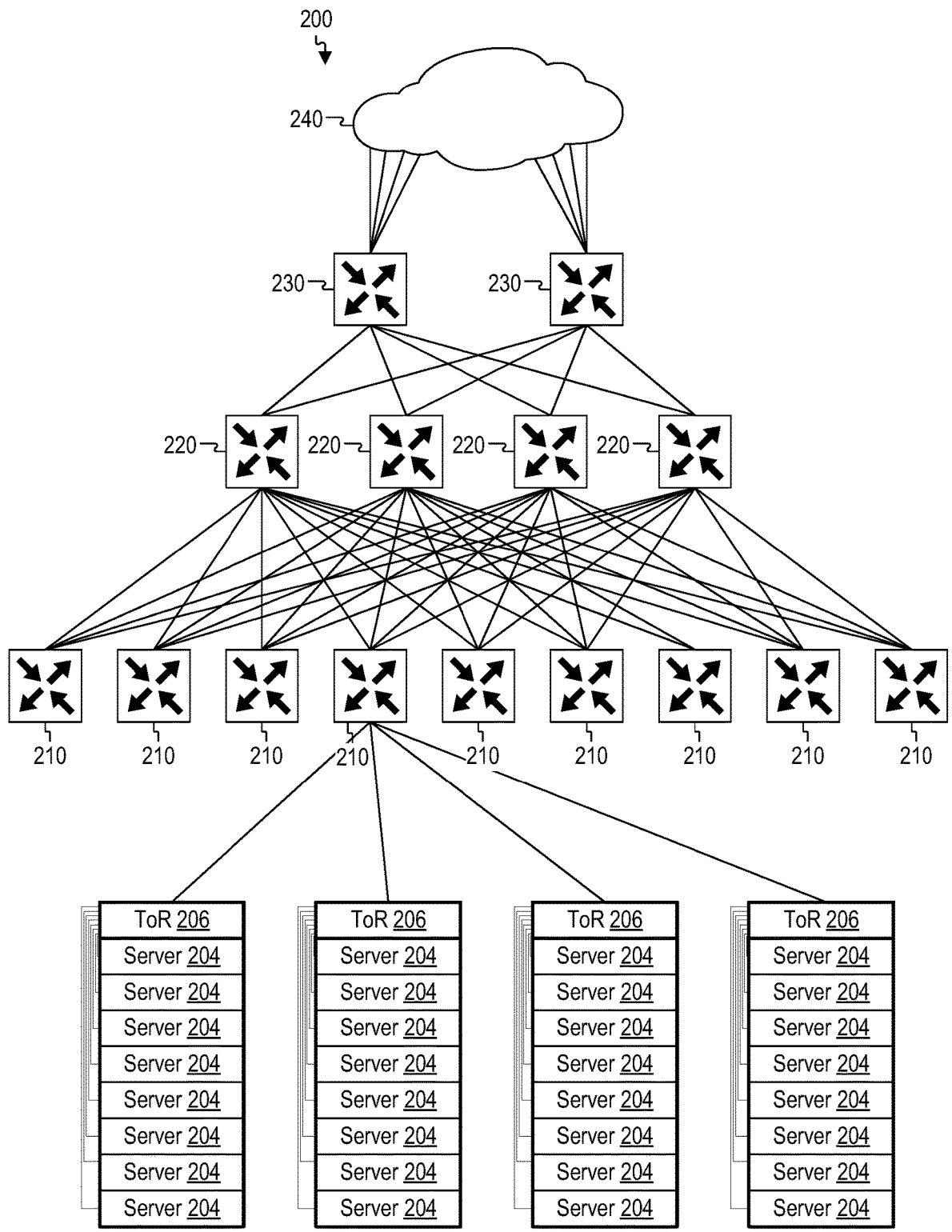
FIG. 2 illustrates a block diagram of a data center in accordance with some examples of the disclosure.

FIG. 2 illustrates a block diagram of a data center 200 in accordance with an embodiment. The data center 200 includes a plurality of racks 202 that each include a plurality of rackmount servers 204 fixed into the racks 202. Each server 204 is attached to a top of rack (ToR) switch 206, which connects to a router 210. The routers 210 are considered an egress point into the cloud fabric for traffic engineering purposes within the data center.

Each router 210 receives control plane information via a network management function and determines how to route packets to spine routers 220. The spine routers 220 further determine how to route the packets to super spine routers 230, which determine how to route the packets into the core network 240 (e.g., Internet).

Thus, network architecture 100 and data center 200 can include numerous network devices that are geographically distributed. Network devices fail and often need to be repaired by transmitting the equipment to a service agent. However, these network devices can be owned and operated by security conscious entities (e.g., government agencies, military, military contractors, etc.) that advertently or inadvertently have highly sensitive and proprietary data stored in the network devices. In this case, the entity may not trust returning damaged or defective network devices using a return merchandise authorization (RMA) procedure because a malicious party (e.g., a state-sponsored entity) could intercept the network devices in transmit to the service agent. The malicious party could then inspect the network device for sensitive information.

Wiping the network device with standard methods such as deleting files or reformatting long-term storage are not preferred because there is concern that the secure formatting is not carried out properly. Moreover, the network device may be inoperative and may not be boot because logic controller failure. In such cases, the network device cannot be securely wiped to allow the device to be returned for repair. However, a motivated malicious party that intercepts the network device may be able to read data stored in the network device with adequate hardware and resources, even if that network device cannot boot. Accordingly, security conscious entities opt to destroy the network devices rather than return the network devices for repair. It is estimated that approximately 3% of customers choose to destroy the network devices rather than seek repair.

Security mechanisms using memory management and hardware modules are described below in FIG. 3 and FIG. 4, which will be followed by methods to use the security mechanisms to secure sensitive information using configuration payload policies.

Figure 3:
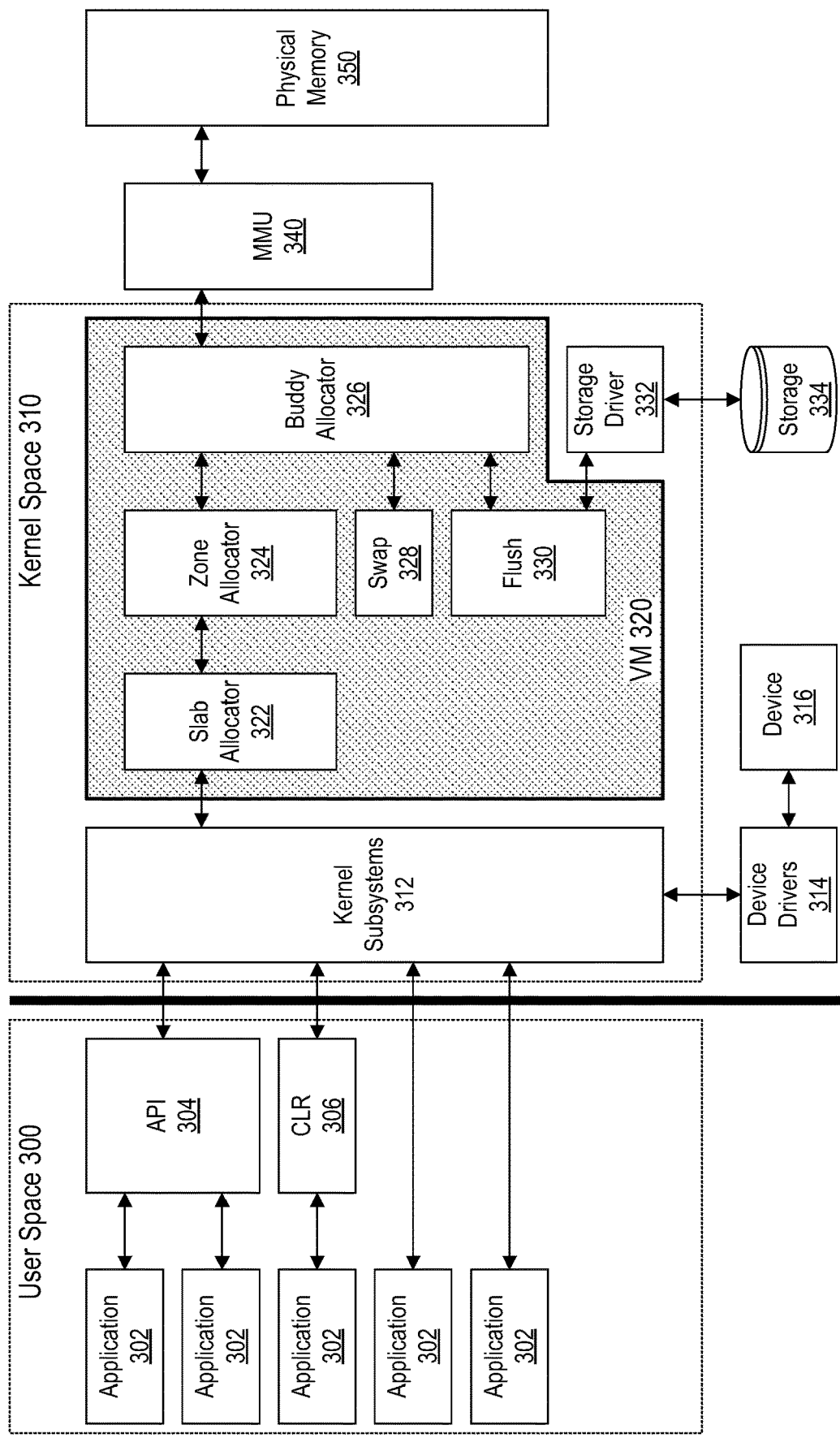
FIG. 3 illustrates a block diagram of memory space in accordance with some examples of the disclosure.

FIG. 3 illustrates a logical diagram of memory space of an operating system (OS) in accordance with an embodiment. In particular, FIG. 3 illustrates that a user space 300 and a kernel space 310 are separated by a logical barrier to isolate application and system resources for security purposes and system purposes. Specifically, FIG. 3 illustrates data from the user space 300 and a kernel space 310 are mapped into the physical memory 350. The physical memory can be implemented by any suitable random access memory (RAM) such as static RAM (SRAM) or synchronous dynamic RAM (SDRAM).

A modern operating systems can implement a virtual memory that collects and manages memory from a collection of memory devices (e.g., non-volatile hard disk or other non-RAM storage media to provide additional program memory) to create a virtual memory, a protected memory, and a shared memory. A virtual memory is a collection of all memories, a protected memory provides exclusive access to a region of memory that is allocated to a process, and a shared memory provides cooperative access to a region that is shared by multiple processes.

Memory is configured in distinct units and can vary based on the type of memory. For example, a hard disc allocates blocks in 512 bytes intervals and a Linux kernel allocates a page of memory in 4096 byte intervals.

In the example illustrated in FIG. 3, a plurality of applications 302 that execute within the user space 300 and may call an application programming interface (API) 304 or may be use a common language runtime (CLR) 306 (e.g., java, C#, webassembly) to access kernel subsystem 312 in the kernel space. The API 304 of the CLR 306 can implement logic to manage the heap, which is a dynamically sized memory that changes during runtime (e.g., as the application executes).

For example, an application 302 written in C# may use the CLR 306 to perform a network request to another device. The application 302 itself includes instructions that are executed by the CLR 306 or API 304 to interact with the kernel subsystem 312. In this case, the API 304 or the CLR 306 manage the heap of the application.

The kernel subsystem 312 also provides access to hardware devices. For example, in the C# example application describe above, the application 302 includes instructions for the CLR 306 to execute a network request. In this case, the CLR 306 generates and provides the request to the kernel subsystems 312, which provides suitable instructions to a device driver 314 to perform the network request using the device 316. For example, the device 316 could be a network interface to execute a hypertext protocol (HTTP) get request for specific data (e.g., a request to retrieve a web page).

In some cases, an application 302 may implement its own heap management functions and directly interact with the kernel subsystems 312 without the API 304 or the CLR 306. Although not illustrated, such an application 302 may operate with an API 304 on a selective basis to perform some functions (e.g., interaction with devices 316) but omit other aspects (e.g., heap management).

The kernel subsystem 312 uses the VM 320 to handle management of the physical memory 350 and perform access (e.g., read/write) functions. The VM 320 comprises a slab allocator 322, a zone allocator 324, and a buddy allocator 326 for controlling memory allocation and access.

The buddy allocator 326 allocates physically contiguous blocks of memory within the entire system. Specifically, the buddy allocator 326 allocates pages and maps each page into a memory management unit (MMU) 340 that performs the read and write operations in the physical memory 350. The buddy allocator 326 receives a memory request and maps the request to a valid physical address range for the MMU 340. The buddy allocator 326 receives a request for a memory allocation and thereby allocates pages of memory. The buddy allocator 326 prefers to allocate contiguous portions of memory for applications. In some hardware configurations, the MMU 340 may not be present and may be implemented by a software module.

The zone allocator 324 is used to allocate pages in different zones that are designed by the OS. For example, zones can include a direct memory access (DMA) zone, a normal zone, and a high memory zone. The DMA zone is provided for direct memory operations of legacy devices. The normal zone includes memory addresses used by the kernel for internal data structures as well as other system and user space allocations. The high memory zone is used for allocation of system resources (e.g., file system buffers, user space allocations, etc.).

The slab allocator 322 can provide finer control by creating pages and segmenting the pages into caches that are initialized by the zone allocator 324. In some examples, the slab allocator 322 creates different caches for each object type (e.g., inode_cache, dentry_cache, buffer_head, vm_area_struct) for storing each object in the corresponding cache.

The VM 320 may also include a swap 328 and a flush 330 that are used for maintaining the swap, which is conventionally used to handle memory addressing when the physical memory 350 becomes largely or fully utilized. The flush 330 may interact with a storage driver 332, which stores swap content in a non-volatile storage 334.

The kernel space 310 is controlled and only accessible to the kernel because it provides all mechanisms to access the physical memory 350 and storage 334. The various applications 302 store data within the user space 300. The user space 300 and kernel space 310 are separated to isolate separate concerns and provide a security barrier to prevent applications from intentionally or unintentionally writing in the kernel space 310. For example, in the example of the network request, the C# applications is not concerned about the implementation details of the network request (e.g., a WebSocket request) and is concerned whether the request is successful or not. Therefore, the user space 300 contains the application information for the network request and the kernel space 310 stores information required to implement that network request.

The kernel space 310 implements security precautions and attempts to prevent access by applications to prevent intentional and unintentional malicious memory access from occurring. For example, the kernel space 310 may attempt to prevent a row hammer attack, which is a repeated bit-flipping of a row of memory addresses to attempt to cause neighboring bits to unintentionally flip values due to electromagnetic effects repeated bit flipping. Row hammer attacks can be used to escalate user privileges so that a malicious entity can access the kernel space 310.

The VM 320 is an example of a memory management system that manages the physical memory and separates application content in the user space 300 and system content in the kernel space 310. Anther OS may implement a memory management subsystem differently but use similar concepts to provide a layer of system security to prevent applications 302 from being able to access the kernel space 310.

In some instances, the processor and/or the system itself may include additional devices to provide additional layers of security. For example, the processor, which is not illustrated in FIG. 3, may include a secure register that is not available for general use has security precautions. For example, a processor may include a secure configuration register (SCR) that can be programmed during a boot sequence with a security score. A specific hardware component may be configured to calculate the security score during the boot sequence and store that score in the SCR.

Figure 4:
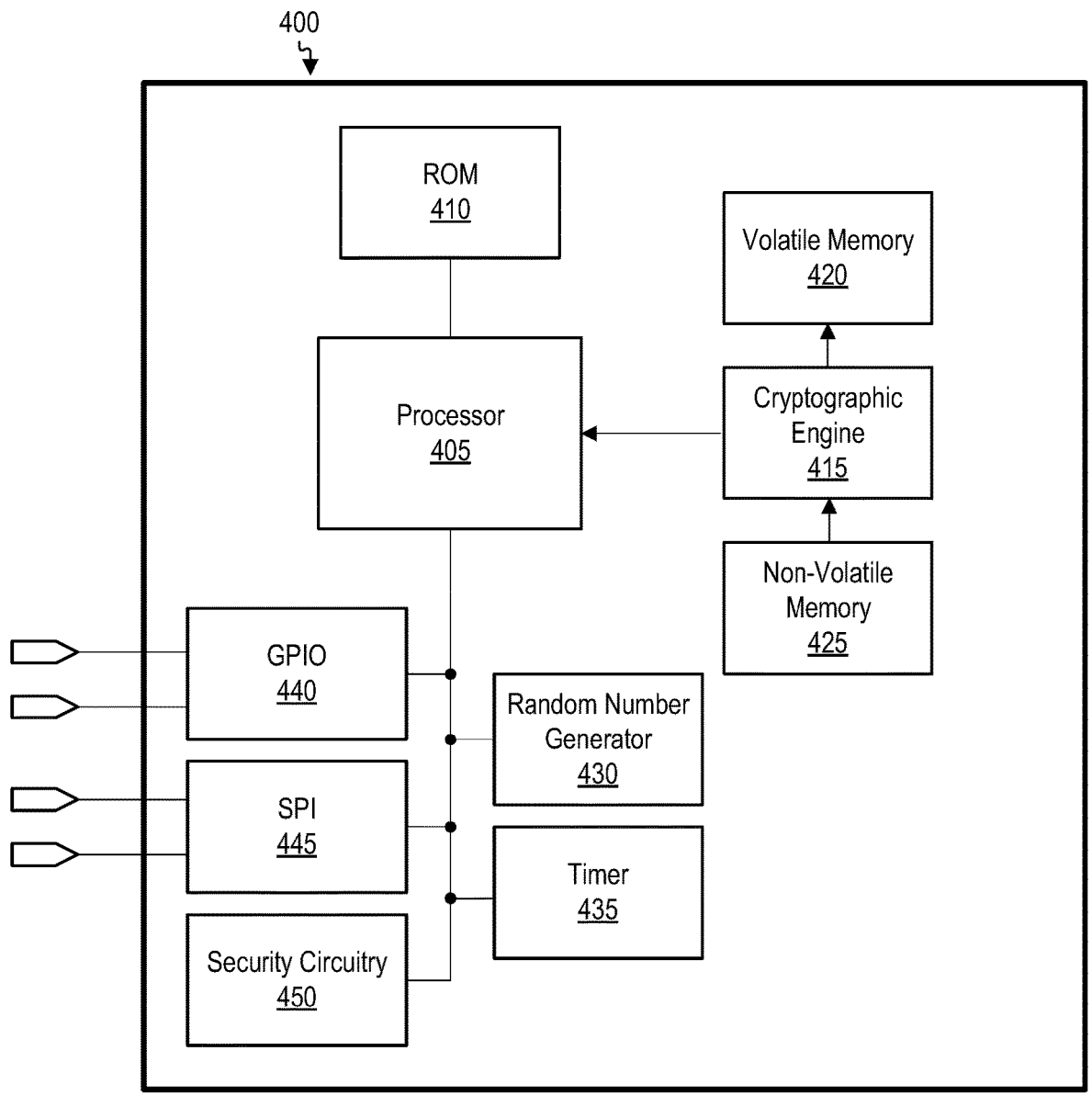
FIG. 4 shows an example of a trusted platform module (TPM) that can be implemented into electronic devices in accordance with some examples of the disclosure.

FIG. 4 illustrates an example block diagram of a trusted platform module (TPM) 400. In some example, the TPM 400 can be configured in any number of devices that require a level of physical and digital security. For example, TPM 400 can be implemented by any device that requires physical and digital security (e.g., processors, logic circuits, networking equipment, mobile phones, tablet devices, flash memory devices, cryptographic authenticators, displays, printers, etc.).

The TPM 400 includes a processor 405 that cannot be accessed directly and provides a secure enclave for sensitive data that cannot be leaked. Data that is stored in a TPM 400 is referred to as artifacts and can only be accessed from an external processor (not shown) by providing commands on the interfaces described below. The processor 405 is connected to a read only memory (ROM) program 410 that provides secure instructions to securely boot and operate the TPM 400. In some cases, the ROM program 410 can be used to perform a hardware anchor function for the external processor to verify the external processor's bootloader.

The TPM 400 includes a cryptographic engine 415 that connects a volatile memory 420 (e.g., SRAM) and a non-volatile memory 425 (e.g., a flash memory) to the processor 405. The cryptographic engine 415 securely encrypts and decrypts data stored in either the volatile memory 420 or the non-volatile memory 425 and performs cryptographic hash functions and other iterative processes that can be performed by a dedicated hardware implementation. In the example illustrated in FIG. 4, the cryptographic engine 415 is placed in series with the volatile memory 420 or the non-volatile memory 425 to perform encryption and decryption before the data is received by the processor 405. In other examples, the cryptographic engine 415 may be placed in series so that the processor 405 fetches and stores encrypted data and calls the cryptographic engine 415 to decrypt or encrypt data directly within the processor 405. The volatile memory 420 and the non-volatile memory 425 are configured to be inaccessible by outside of the TPM 400.

The TPM 400 also includes a random number generator (RNG) 430 that generates a sequence of numbers or symbols that cannot be reasonably predicted better than by a random chance. The RNG 430 can be implemented as truly random hardware random-number generators to generate random numbers as a function of current value of some physical environment attribute that is constantly changing in a manner that is practically impossible to model. The RNG 430 can also be a pseudorandom number generators and generates numbers that look random but are deterministic.

The TPM 400 also includes a timer 435 to perform timing functions in connection with various security functions (challenge/response) of the TPM 400. The TPM 400 also include a general purpose input/output (GPIO) 440 for sending and receiving data. The TPM 400 also includes a serial peripheral interface (SPI) for sending and receiving data. In some cases, the SPI 445 can be configured in child mode that requires a parent SPI interface to provide instructions to control the communication interface.

The TPM 400 also includes security circuitry 450 to detect tampering and other anomalous events. For example, the security circuitry 450 may include voltage and temperature tampers, an active shield, and other physical security measures that would indicate that the TPM 400 is being physically altered. The security circuitry 450 cause the processor 405 to output information via GPIO 440 and SPI 445 to indicate that the TPM 400 was compromised and the TPM 400 cannot be trusted. The security circuitry 450 can also wipe sensitive data in a secure manner.

The TPM 400 is configured to perform power-on self-tests when booted or reset. First, the TPM 400 performs a self-test to verify the RNG 430 and secure hash algorithm (SHA) capabilities for secure boot operations. After self-test verification, the remaining tests verify the integrity of the remaining system components. The TPM 400 is configured to securely store data and prevent leaking of sensitive data (e.g., encryption keys) and other information. For example, an external processor may use the TPM 400 to securely store encryption keys.

In some examples, the TPM 400 can also be implemented as a trusted anchor module (TAm) that includes additional security precautions that secures a boot process. A TAm is fixed hardware device that is permanently programmed during manufacture with a unique device identifier and is designed to provide both end-user and supply chain protections. In particular, a TAm module is permanently programmed during manufacturing with a secure unique device identifier (SUDI) during manufacturing and secures the hardware at the time of manufacture. The SUDI is a tamperproof ID for the TPM 400 and binds the hardware identity to a key pair in a cryptographically secure X.509 certificate during manufacturing. The SUDI allows connections with the device to be authenticated by the SUDI credential.

A TAm can be implemented to verify the authenticity and licenses during boot. For example, a TAm can be implemented it a network router. The TAm of the network router first verifies hardware and software integrity to allow the wireless router to complete the boot cycle. Once booted, the wireless router then sends information (e.g., the SUDI encrypted with an X.509 certificate) to an external server to verify that the hardware and software is authentic. The external server and the wireless router can then securely provision network services based on hardware authentication. In some cases, the TPM 400 can be included in a device along with a separate TAm.

With various example systems and network architectures described above with reference to FIGS. 1-4, the disclosure now turns to the proposed solution mentioned above for securely wiping out sensitive and private information on a device and allowing them to be returned to an equipment provider or manufacturer without exposing the sensitive and private information on such devices to a possible compromise.

Figure 5:
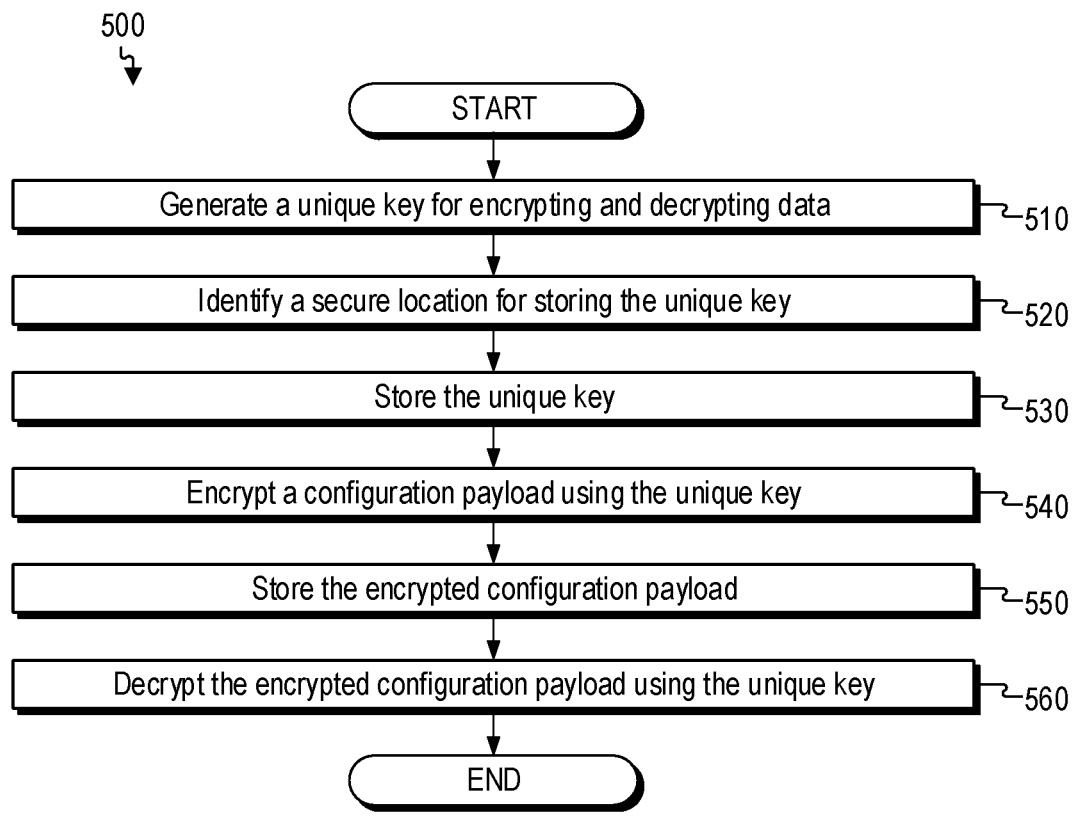
FIG. 5 is a flowchart of a method for implementing a configuration payload separation policy in accordance with some examples of the disclosure.
Figure 8:
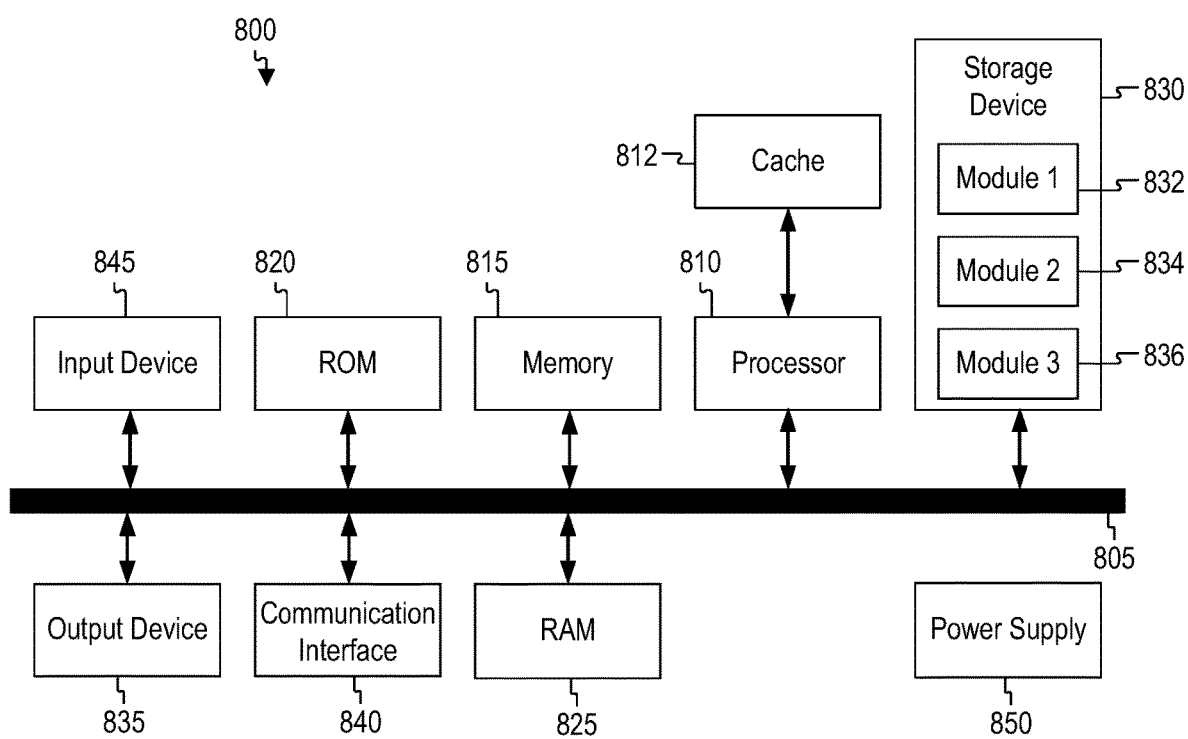
FIG. 8 shows an example of computing system 800, which can be for example any computing device that can implement components of the system

FIG. 5 illustrates an example method 500 that can be implemented by a network device for implementing a configuration payload separation policy. Example network devices include an edge network device 142, a network controller 132, a network manager 122, or a network orchestrator 104 described above with reference to FIG. 1. Each network device can include a processor 810 and other hardware devices that are illustrated in FIG. 8 below to achieve the functionality described by the method 500. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method 500 includes, during a boot sequence, generating a unique key for encrypting and decrypting data at block 510. Process at block 510 may be performed by a network device (e.g., a server, a router, a switch, an endpoint network device, etc., such as an edge network device 142, a network controller 132, a network manager 122, or a network orchestrator 104 described above with reference to FIG. 1). For example, the processor 810, which may be a component of a network device, may generate true random numbers (e.g., using a TPM 400) and create the unique key based on a seed (e.g., the true random number). In that case, during the boot sequence, the processor 810 may generate the unique key for encrypting and decrypting data at block 510.

In some examples, block 510 may further include receiving a boot loader over a network to perform the boot sequence (e.g., based on a request). For example, the processor 810 may be configured to boot the device using a network bootloader. Accordingly, the processor 810 may transmit a request and then receive a boot loader over a network. The boot loader may implement the boot sequence. In some example, the request for the bootloader may include authentication information (e.g., the x.509 certificate) for authentication of the network device by a central server. If the network device is authentic, the central server then sends the bootloader to the network device.

According to some examples, the method 500 includes identifying a secure location in the network device for storing the unique key at block 520. The processor 810 may perform a security check for each device (e.g., non-volatile RAM, solid-state disk (SSD) drive, network interface, a TPM, etc.) to validate authenticity of the system. The processor 810 can also validate the authentication of other physical and logical components (e.g., file system level security, hardware level security, boot image security etc.). The processor 810 identifies a most secure non-volatile memory of the network device based on the security check and stores the unique key in that non-volatile memory. The more secure non-volatile memory could be any component of the system such as a SSD, but could also be a TPM module integral to a logic board of the network device, or a TPM module attached to a network interface within the network device.

After identifying the secure location, the method 500 includes storing the unique key in the secure location at block 530. In some cases, the unique key may be stored in a volatile memory that is inaccessible from user space or in a secure register of a processor of the network device that is inaccessible from user space while decrypting or encrypting data. However, the unique key is never stored in an external non-volatile memory that is attached to the network device.

According to some examples, the method 500 includes encrypting a configuration payload with the unique key at block 540. The configuration payload is sensitive information located in the network device that helps the device to function. For example, the payload configuration can include device configuration, certificates and keys, databases, logs or traces, or runtime data.

The device configuration can be data provided command line interpreter (CLI) information, yet another next generation (YANG) data model, extensible markup language (XML) or JavaScript object notation (JSON) for configuring services or settings, and virtual LAN (VLAN) information. In some cases, certificates and keys that need to be accessed by the network device include keys that would be used to encrypt other system storage such as hard drives or any other customer keys used in the device operation. Relevant database can be short or long and would store sensitive information such as usernames, IP address, fully qualified domain names (FAD), email addresses, hashed password. Logs and traces may include sensitive information such as IP addresses and can be included in the payload configuration. Runtime data is any runtime generated data that is typically stored on the device (e.g. troubleshooting info, session info, etc.) that can include sensitive information.

The configuration payload is generally any sensitive and/or private information for configuring a particular network device and/or any other sensitive or private information of an entity that could provide a malicious entity insight into the network configuration or provide access into the network and its associated data. The processor 810 may therefore encrypt the configuration payload using the unique key to secure that information and preclude a malicious entity from being able to access the configuration payload.

According to some examples, the method 500 includes storing the encrypted configuration payload in an external non-volatile memory at block 550. For example, the external non-volatile memory may be physically detachable from the network device. Thus, the processor 810 may store the encrypted configuration payload in an external non-volatile memory (e.g., a USB mass storage device, a flash drive, etc.) and, when the external non-volatile memory is separated from the network device, the configuration payload cannot be inspected. Even if a malicious entity could access the unique encryption key, which is stored in a secure location of the network device, the encrypted content is not available after the external non-volatile memory is detached. For example, when a network device is damaged and is being returned for service and a state-sponsored entity intercepts that network device (e.g., during shipment of the network device (not the external non-volatile memory) back to the device provider/manufacturer), the configuration payload would not be present and the state-sponsored entity would be unable to access any information. Moreover, because the network device includes physical security measures, the state-sponsored entity could not alter the network device.

Thus, storing the configuration payload in the external non-volatile memory allows the network device to be returned, replaced, and/or repaired without exposing the configuration payload and/or any other sensitive data to unauthorized/malicious access. In some cases, the external non-volatile memory can be implemented by a network storage device of that entity, which can provide further security measures because no removal of the external non-volatile memory would be required. In some cases, even if the network storage device with the encrypted configuration data stored thereon is to be replaced and/or returned for service, doing so would not expose the encrypted configuration data to any unauthorized access because the key is not stored in the same device (e.g., it is stored on the network device as described above with reference to step 530.

According to some examples, the method 500 includes, in response to a request to access data within the configuration payload, decrypting the encrypted configuration payload using the unique key at block 560. For example, the processor 810 may in response to a request to access data within the configuration payload, decrypt the encrypted configuration payload using the unique key.

Figure 6:
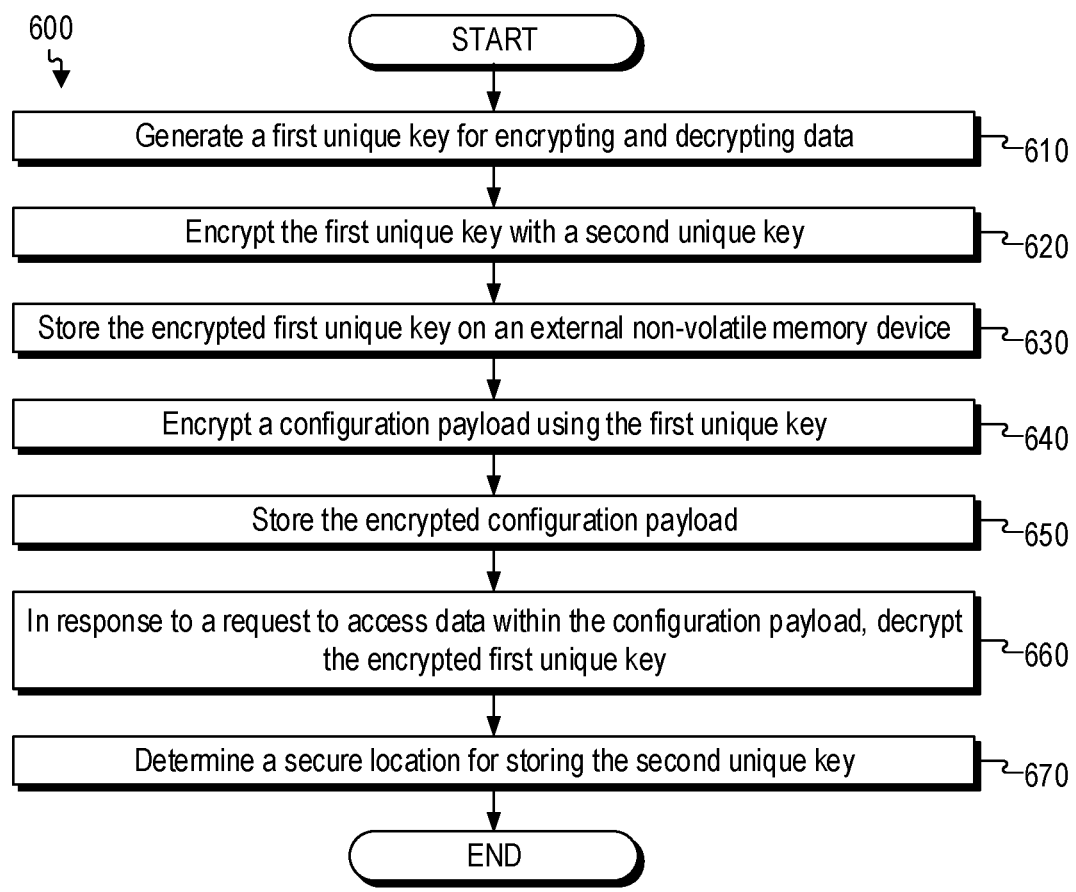
FIG. 6 is a flowchart of another method for implementing a configuration payload separation policy in accordance with some examples of the disclosure.

FIG. 6 illustrates another example method 600 that can be implemented by a network device for implementing a configuration payload separation policy. Example network devices include an edge network device 142, a network controller 132, a network manager 122, or a network orchestrator 104 described above with reference to FIG. 1. Each network device can include a processor 810 and other hardware devices that are illustrated in FIG. 8 below to achieve the functionality described by the method 600. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 includes obtaining or generating a first unique key for encrypting and decrypting data at block 610. For example, a during a boot sequence, the processor 810 may generate or receive the first unique key. The process at block 610 may be performed by a network device (e.g., a server, a router, a switch, an endpoint network device, etc., such as an edge network device 142, a network controller 132, a network manager 122, or a network orchestrator 104 described above with reference to FIG. 1). For example, the processor 810, which may be a component of a network device, may, during a boot sequence, generate a first unique key for encrypt and decrypt data. In some examples, block 610 may further include receiving a boot loader over a network to perform the boot sequence (e.g., based on a request). In other examples, the first unique key may be received by another secure mechanism, such as being provided from another device that generates the first unique key, receiving the first unique key through from a secure network device, receiving the first unique key from a hardware device that is physically connected to the network device, or another secure mechanism (e.g., ownership voucher).

According to some examples, the method 600 includes encrypting the first unique key with a second unique key at block 620. For example, the processor 810 may also generate a second key, which is used by the processor 810 to encrypt the first unique key.

According to some examples, the method 600 includes storing the encrypted first unique key on an external non-volatile memory device (e.g., a USB mass storage device, a flash drive, etc.) at block 630. For example, the processor 810 of the network device may store the encrypted first unique key on an external non-volatile memory device that can be physically detached from the computing system 800.

According to some examples, the method 600 includes encrypting a configuration payload with the first unique key at block 640. For example, the processor 810 may encrypt a configuration payload with the first unique key. As described in more detail above, the configuration payload comprises one or more of configuration information, IP addresses, VLAN information, security certificates, encryption keys, unique user information, log information, trace information, runtime application data.

According to some examples, the method 600 includes storing the encrypted configuration payload in an internal non-volatile memory of the network device at block 650. For example, when the network device is implemented by the computing system 800 and receives a configuration update that changes a configuration setting in the network, the processor 810 may store the encrypted configuration payload in an internal non-volatile memory of the network device. When the external non-volatile memory is not attached to the network device, the network device is unable to decrypt the contents in the encrypted payload configuration.

According to some examples, the method 600 includes, in response to a request to access data within the configuration payload, decrypting the encrypted first unique key using the second unique key and decrypting the encrypted configuration payload using the first unique key at block 660. For example, the processor 810 may receive a request to access data within the configuration payload, decrypt the encrypted first unique key using the second unique key and decrypt the encrypted configuration payload using the first unique key. Therefore, removal of the external non-volatile memory can enforce a security policy and prevent sensitive information in the configuration payload from being accessed. Moreover, a malicious entity will waste resources gaining access to the second encryption key, which does not encrypt the contents stored in the network device.

According to some examples, the method 600 includes determining a secure location for storing the second unique key based on a security check of each non-volatile memory at block 670. For example, the processor 800 can store the determine to store the second unique key in another non-volatile memory in the network device that is determined to be the most secure location in the network device. In some cases, the second unique key may be stored in a secure network location that is accessible within a specific geographic area. In other cases, the second unique key may be stored in a secure network location that is provided to the network device after authentication using a TPM/TAm.

Thus, storing the encryption in the external non-volatile memory allows the network device to be returned, replaced, and/or repaired without exposing the configuration payload and/or any other sensitive data to unauthorized/malicious access. In some cases, the external non-volatile memory can be implemented by a network storage device of that entity, which can provide further security measures because no removal of the external non-volatile memory would be required. In some cases, even if the network storage device with the encrypted configuration data stored thereon is to be replaced and/or returned for service, doing so would not expose the encrypted configuration data to any unauthorized access because the key is not stored in the same device (e.g., it is stored on the network device as described above with reference to step 530.

Moreover, in the event the external non-volatile memory is lost, any data therein is encrypted with an encryption key located in a different device. Thus, the configuration payload is unreadable because security of the system depends on having the encrypted tiles and the corresponding key together. This provides a practical solution because it is simple to separate the external non-volatile memory from the network device, can be implemented even when the network device is damaged, and guarantees the security of data. Even if the cryptographic algorithm is compromised, the security provided through the instant disclosure would be maintained by separating the encryption key from the encrypted data.

Thus, the instant disclosure provides a strong reassurance that a sensitive information is removed and allows for architectures to be developed without complex and costly controls to manage risk if a device was compromised. For example, when deploying VPN solutions, if a hardware device is lost, stolen, or misplaced, a certificate is required to be revoked, a new certificate revocation list (CRL) is published, and the CRL cache on all other network devices in the VPN must be refreshed. This can be a costly experience for customers because it requires creating processes, creating runbooks, and performing processes of disparate functioning teams (NOC, SOC, PKI). There is also a window of opportunity for an attacker to compromise the solution prior to all other network devices obtaining the published CRL. By mitigating the ability for an adversary to compromise such sensitive material, the disclosure mitigates the need to deploy complex procedures, reduces risk and as such increases the overall security of customers.

Figure 7:
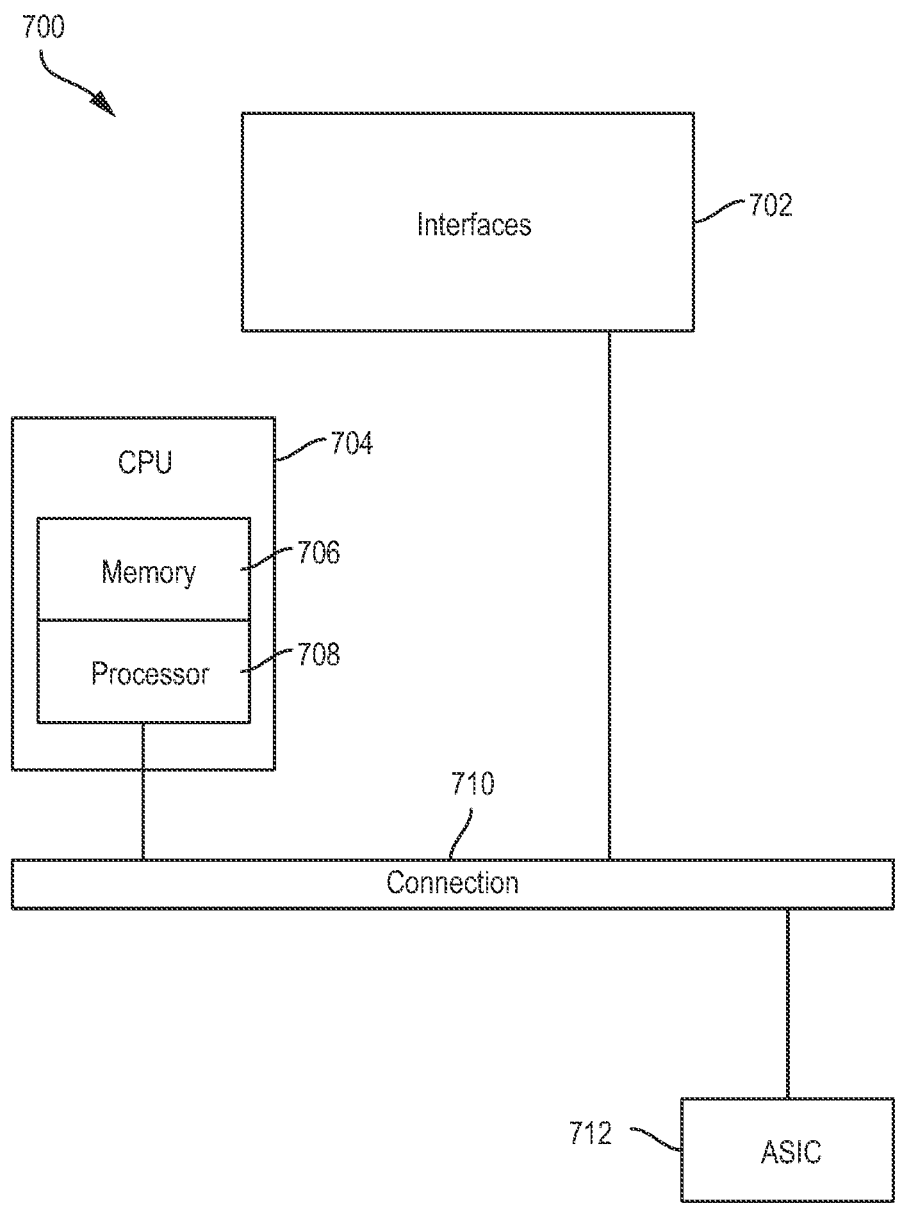
FIG. 7 illustrates an example network device in accordance with some examples of the disclosure.

FIG. 7 illustrates an example network device 700 suitable for performing switching, routing, load balancing, and other networking operations. The example network device 700 can be implemented as switches, routers, nodes, metadata servers, load balancers, client devices, and so forth.

Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 704) to efficiently perform routing computations, network diagnostics, security functions, etc.

Although the system shown in FIG. 7 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an ASIC, which can be configured to perform routing and/or switching operations. The ASIC can communicate with other components in the network device 700 via the bus 710, to exchange data and signals and coordinate various types of operations by the network device 700, such as routing, switching, and/or data storage operations, for example.

FIG. 8 shows an example of computing system 800, which can be for example any computing device for implementing method 500 or method 600, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and RAM 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, RAMs, read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

The computing system 800 may also include a power supply 850 that converts electrical power in one form (e.g., AC, DC) into a usable form for the computing system. As an example, when the computing system 800 is a network device that is fixed into a rack in a data center, the power supply may convert 120V AC into a multiple DC voltages (e.g., 12V, 5V, 3.3V) suitable for the various devices in the computing system 800. For example, the processor 810 may require a different DC voltage than the RAM 825.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method comprising: during a boot sequence of a network device, generating a unique key for encrypting and decrypting data; identifying a secure location in the network device for storing the unique key; storing the unique key in the secure location; encrypting a configuration payload with the unique key; storing the encrypted configuration payload in an external non-volatile memory; and in response to a request to access data within the configuration payload, decrypting the encrypted configuration payload using the unique key.

Aspect 2. The method of Aspect 1, wherein the secure location is determined to be a most secure location of the network device based on a security check of each non-volatile memory.

Aspect 3. The method of any of Aspects 1 to 2, wherein the configuration payload comprises one or more of configuration information, IP addresses, VLAN information, security certificates, encryption keys, unique user information, log information, trace information, runtime application data.

Aspect 4. The method of any of Aspects 1 to 3, wherein the external non-volatile memory is physically detachable from the network device.

Aspect 5. The method of any of Aspects 1 to 3, wherein the external non-volatile memory comprises a network storage device.

Aspect 6. The method of any of Aspects 1 to 3 and either 4 or 5, further comprising: receiving a boot loader over a network to perform the boot sequence.

Aspect 7. The method of any of Aspects 1 to 3, 6, and either 4 or 5, wherein sensitive information stored in the external non-volatile memory is inaccessible when detached from the network device.

Aspect 8. A method comprising: during a boot sequence of a network device, generating a first unique key for encrypting and decrypting data; encrypting the first unique key with a second unique key; storing the encrypted first unique key on an external non-volatile memory device; encrypting a configuration payload with the first unique key; storing the encrypted configuration payload in an internal non-volatile memory of the network device; and, in response to a request to access data within the configuration payload, decrypting the encrypted first unique key using the second unique key and decrypting the encrypted configuration payload using the first unique key.

Aspect 9. The method of Aspect 8, further comprising: determining a secure location for storing the second unique key in the network device based on a security check of each non-volatile memory.

Aspect 10. The method of any of Aspects 8 to 9, wherein the second unique key is stored in a network location that is accessible to the network device after authentication.

Aspect 11. The method of any of Aspects 8 to 10, wherein the configuration payload comprises one or more of configuration information, IP addresses, VLAN information, security certificates, encryption keys, unique user information, log information, trace information, runtime application data.

Aspect 12. The method of any of Aspects 8 to 11, wherein the external non-volatile memory is physically detachable from the network device.

Aspect 13. The method of any of Aspects 8 to 11, further comprising: receiving a boot loader over a network to perform the boot sequence.

Aspect 14: A network device includes a storage (implemented in circuitry) configured to store instructions and a processor. The processor configured to execute the instructions and cause the processor to: during a boot sequence of a network device, generating a unique key for encrypting and decrypting data; identify a secure location in the network device for storing the unique key; store the unique key in the secure location; encrypt a configuration payload with the unique key; store the encrypted configuration payload in an external non-volatile memory; and, in response to a request to access data within the configuration payload, decrypt the encrypted configuration payload using the unique key.

Aspect 15: The network device of Aspect 14, wherein the secure location is determined to be a most secure location of the network device based on a security check of each non-volatile memory.

Aspect 16: The network device of any of Aspects 14 to 15, wherein the configuration payload comprises one or more of configuration information, IP addresses, VLAN information, security certificates, encryption keys, unique user information, log information, trace information, runtime application data.

Aspect 17: The network device of any of Aspects 14 to 16, wherein the external non-volatile memory is physically detachable from the network device.

Aspect 18: The network device of any of Aspects 14 to 16, wherein the external non-volatile memory comprises a network storage device.

Aspect 19: The network device of any of Aspects 14 to 16, wherein the processor is configured to execute the instructions and cause the processor to: receive a boot loader over a network to perform the boot sequence.

Aspect 20: The network device of any of Aspects 14 to 19, wherein sensitive information stored in the external non-volatile memory is inaccessible when detached from the network device.

Aspect 21: A network device includes a storage (implemented in circuitry) configured to store instructions and a processor. The processor configured to execute the instructions and cause the processor to: one or more memories having computer-readable instructions; and one or more processors configured to execute the computer-readable instructions to: during a boot sequence, generate a unique key for encrypting and decrypting data; identify a secure location in the network device for storing the unique key; store the unique key in the secure location; encrypt a configuration payload with the unique key; and store the encrypted configuration payload in an external non-volatile memory; and in response to a request to access data within the configuration payload, decrypt the encrypted configuration payload using the unique key.

Aspect 22: The network device of Aspect 21, wherein the secure location is determined to be a most secure location of the network device based on a security check of each non-volatile memory.

Aspect 23: The network device of any of Aspects 21 to 22, wherein the configuration payload comprises one or more of configuration information, IP addresses, VLAN information, security certificates, encryption keys, unique user information, log information, trace information, runtime application data.

Aspect 24: The network device of any of Aspects 21 to 23, wherein the external non-volatile memory is physically detachable from the network device.

Aspect 25: The network device of any of Aspects 21 to 24, wherein the processor is configured to execute the instructions and cause the processor to: receive a boot loader over a network to perform the boot sequence.

Aspect 26: The network device of any of Aspects 21 to 25, wherein sensitive information stored in the network device is inaccessible when detached from the network device.

What is claimed is:

1. A method comprising:
during a boot sequence of a network device, generating a first unique key for encrypting and decrypting data;
encrypting the first unique key with a second unique key to determine an encrypted first unique key;
storing the encrypted first unique key on an external non-volatile memory device;
encrypting a configuration payload with the first unique key;
storing the encrypted configuration payload on an internal non-volatile memory device;
in response to a request to access data within the configuration payload, decrypting the encrypted first unique key using the second unique key and decrypting the encrypted configuration payload using the first unique key;
authenticating the network device by performing a security check on each component of a plurality of different types of components of the network device;
in response to the authenticating of the network device, identifying, a secure location in the network device for storing the second unique key, wherein the secure location is one of the plurality of different types of components of the network device;
and storing the second unique key in the secure location that is accessible to the network device after authentication of the network device.

2. The method of claim 1, wherein the secure location is determined to be a most secure location of the network device, and wherein the plurality of different types of components of the network device includes non-volatile memory.

3. The method of claim 1, wherein the configuration payload comprises one or more of configuration information, IP addresses, VLAN information, security certificates, encryption keys, unique user information, log information, trace information, runtime application data.

4. The method of claim 1, wherein the external non-volatile memory is physically detachable from the network device.

5. The method of claim 1, wherein the external non-volatile memory comprises a network storage device.

6. The method of claim 1, further comprising:
receiving a boot loader over a network to perform the boot sequence.

7. The method of claim 1, wherein sensitive information stored in the external non-volatile memory is inaccessible when detached from the network device.

8. A method comprising:
during a boot sequence of a network device, generating a first unique key for encrypting and decrypting data;
encrypting the first unique key with a second unique key to determine an encrypted first unique key;
storing the encrypted first unique key on an external non-volatile memory device;
encrypting a configuration payload with the first unique key;
storing the encrypted configuration payload in an internal non-volatile memory of the network device;
in response to a request to access data within the configuration payload, decrypting the encrypted first unique key using the second unique key and decrypting the encrypted configuration payload using the first unique key;
authenticating the network device by performing security check on each component of a plurality of different types of components of the network device;
in response to the authenticating of the network device, determining a secure location for storing the second unique key in the network device, wherein the secure location is one of the plurality of different types of components of the network device;
and storing the second unique key in the secure location that is accessible to the network device after authentication of the network device.

9. The method of claim 8, wherein the configuration payload comprises one or more of configuration information, IP addresses, VLAN information, security certificates, encryption keys, unique user information, log information, trace information, runtime application data.

10. The method of claim 8, wherein the external non-volatile memory device is physically detachable from the network device.

11. The method of claim 8, further comprising:
receiving a boot loader over a network to perform the boot sequence.

12. A network device comprising:
one or more memories having computer-readable instructions;
and one or more processors configured to execute the computer-readable instructions to:
during a boot sequence, generate a first unique key for encrypting and decrypting data;
encrypting the first unique key with a second unique key to determine an encrypted first unique key;
storing the encrypted first unique key on an external non-volatile memory device;
encrypting a configuration payload with the first unique key;
storing the encrypted configuration payload on an internal non-volatile memory device;
in response to a request to access data within the configuration payload, decrypting the encrypted first unique key using the second unique key and decrypting the encrypted configuration payload using the first unique key;
authenticating the network device by performing a security check on each component of the plurality of different types of components of the network device;
in response to the authenticating of the network device, identify a secure location in the network device for storing the second unique key, wherein the secure location is one of the pluralities of different types of components of the network device;
and storing the second unique key in the secure location that is accessible to the network device after authentication of the network device.

13. The network device of claim 12, wherein the secure location is determined to be a most secure location of the network device, and wherein the plurality of different types of components of the network device includes non-volatile memory.

14. The network device of claim 12, the configuration payload comprises one or more of configuration information, IP addresses, VLAN information, security certificates, encryption keys, unique user information, log information, trace information, runtime application data.

15. The network device of claim 12, the external non-volatile memory is physically detachable from the network device.

16. The network device of claim 12, the external non-volatile memory comprises a network storage device.

17. The network device of claim 12, wherein the instructions further cause the processor to:

receive a boot loader over a network to perform the boot sequence.

18. The network device of claim 12, sensitive information stored in the network device is inaccessible when detached from the network device.

\* \* \* \* \*